(12) United States Patent
Chance et al.

(10) Patent No.: US 8,055,211 B2
(45) Date of Patent: Nov. 8, 2011

(54) METHOD AND SYSTEM FOR UTILIZING TRANSMIT LOCAL OSCILLATOR FOR IMPROVED CELL SEARCH AND MULTI-LINK COMMUNICATION IN MULTI-MODE DEVICE

(75) Inventors: Gregory W. Chance, Round Lake Beach, IL (US); David Bateman, Hauts de Seine (FR); Francesc Boixadera, Cambridge (GB); William B. Harrold, Cambridge (GB); Armin W. Klomsdorf, Libertyville, IL (US); Markus Muck, Paris (FR); Wayne D. Music, Austin, TX (US)

(73) Assignee: Motorola Mobility, Inc., Libertyville, IL (US)

( * ) Notice: Subject to any disclaimer, the term of this patent is extended or adjusted under 35 U.S.C. 154(b) by 842 days.

(21) Appl. No.: 11/967,519

(22) Filed: Dec. 31, 2007

(65) Prior Publication Data

US 2009/0168914 A1 Jul. 2, 2009

(51) Int. Cl.
*H04B 1/44* (2006.01)
(52) U.S. Cl. .......................................... 455/86; 455/133
(58) Field of Classification Search ............... 455/76, 455/80, 86, 550.1, 552.1, 553.1, 101, 132, 455/135, 136, 137, 277.1, 133; 375/267, 375/347
See application file for complete search history.

(56) References Cited

U.S. PATENT DOCUMENTS

| | | | |
|---|---|---|---|
| 5,511,235 A | 4/1996 | Duong et al. | |
| 5,896,562 A * | 4/1999 | Heinonen | 455/76 |
| 6,678,508 B1 * | 1/2004 | Koilpillai et al. | 455/137 |
| 7,424,271 B2 * | 9/2008 | Shih et al. | 455/76 |
| 7,489,913 B2 | 2/2009 | Welnick et al. | |
| 2003/0003910 A1 | 1/2003 | McClure | |
| 2004/0253955 A1 | 12/2004 | Love et al. | |
| 2006/0148433 A1 * | 7/2006 | Welnick et al. | 455/140 |
| 2006/0193295 A1 | 8/2006 | White | |
| 2007/0021080 A1 | 1/2007 | Kuriyama et al. | |
| 2007/0099584 A1 | 5/2007 | Niu et al. | |

FOREIGN PATENT DOCUMENTS

| | | |
|---|---|---|
| EP | 1486796 A2 | 2/2004 |
| JP | 2000332665 A | 11/2000 |
| WO | 0147126 A2 | 6/2001 |
| WO | 2004/059878 A1 | 7/2004 |

OTHER PUBLICATIONS

Design and Implementation of a 5.25GHz Radio Transceiver for a MIMO Testbed, Stephan Lang, Babak Daneshrad, IEEE WCNC 2005.

(Continued)

*Primary Examiner* — Thanh C Le

(57) ABSTRACT

A multi-receiver wireless communication device includes a transmitter, a transmit oscillator communicatively coupled to the transmitter, a receive oscillator communicatively coupled to a first receiver and second receiver, and a switching assembly having a first state in which the receive oscillator is coupled to the first and second receivers and a second state in which the receive oscillator is de-coupled from the second receiver and the transmit oscillator is coupled to the second receiver. The first receiver and the second receiver of the wireless communication device are able to operate independent of one another when the switching assembly is in the second state.

17 Claims, 10 Drawing Sheets

OTHER PUBLICATIONS

ISR of PCT/US08/87916.
Clarke, Modet & Co, "Office Action", Jan. 12, 2009, p. 1, Argentina Pat. Appln. No. 06 01 00019, Buenos Aies, Argentina.
The State Intellectual Property Office of the People'S Republic of China, "Notification of the First Office Action", Jul. 20, 2010, pp. 1-31, Chinese Pat. Appln. No. 2001580040041.2, Beijing, China.
Perbadanan Harta Intelek Malaysia, "Substantive Examination Adverse Report", Nov. 7, 2008, pp. 1-2, Malaysia Pat. Appln. No. PI 20055815.
PCT, Notification Concerning Transmittal of Copy of International Preliminary Report on Patentability (Chapter 1 of the Patent Cooperation Treaty), Jul. 19, 2007, pp. 1-8, PCT/US2005/044252.
European Patent Office, "Communication", Aug. 6, 2009, pp. 1-2, EPC Appln. No. 05826337.7.

* cited by examiner

METHOD AND SYSTEM FOR UTILIZING TRANSMIT LOCAL OSCILLATOR FOR IMPROVED CELL SEARCH AND MULTI-LINK COMMUNICATION IN MULTI-MODE DEVICE

BACKGROUND OF THE INVENTION

1. Field of the Invention

This invention relates in general to wireless cellular communication devices capable of multiple-input, multiple-output (MIMO) communication and/or receive diversity and, more particularly, to utilizing the transmit local oscillator (LO) to drive a receiver when the transmitter in not in use.

2. Description of the Related Art

A wireless communication device (WCD), such as a cellular telephone, for instance, is required to utilize multiple radio access technologies and multiple frequency bands when performing measurement and synchronization on communication cells. This occurs in the transition from switch-on to camp-on when locating the best cell on the best network and is maintained in Idle mode and in Dedicated mode. Although the WCD must cycle through the multiple radio access technologies and multiple bands, the operator (and end-user) desires a fast reaction time as the radio conditions change.

In a mobility context where the user and/or environment are moving, abrupt shadowing effects are common, e.g., when a device moves around a corner or cars move around a device. This often leads to repeated interruptions in communication. However, users demand mobile voice communication hardware and techniques that will provide seamless handovers when one link breaks. To ensure a seamless handover, the WCD must cycle through the multiple radio access technologies and multiple bands to perform measurements and synchronize on different communication cells. This is a lime and resource limited process. Unfortunately, some radio access technologies such as WLAN or WAN, do not intrinsically support mobility and soft handoffs. Due to these technology limitations, prior art equipment can degrade the user experience.

The reaction time and performance of cell measurement and synchronization can be improved with the operation of two receivers simultaneously to perform concurrent multiple band searches, measurements, and synchronization. Several wireless standards, such as the 802.11n standard defined by the Institute of Electrical and Electronics Engineers (IEEE), now require two or more receiver channels on the modem either for receive diversity, interference cancellation, or two-port Multiple-Input, Multiple-Output (MIMO). However, these receivers can not always be operated independently due to performance gains associated with receive diversity, interference cancellation, or two-port MIMO operation. A method is needed to identify opportunities when both receivers can be operated independently. In addition, the receivers typically share a single Local Oscillator (LO) and the receiver channels are, therefore, tuned to the same Radio Frequency (RF) center frequencies and channel bandwidths. The addition of a second receive LO to the WCD for the purpose of measuring other frequencies is not desirable from a complexity and cost standpoint.

Therefore a need exists to overcome the problems associated with the prior art as discussed above.

SUMMARY OF THE INVENTION

The present invention, according to an embodiment, provides a novel and efficient multi-receiver wireless communication device that includes a transmitter, a transmit oscillator communicatively coupled to the transmitter, a receive oscillator communicatively coupled to a first receiver and second receiver, and a switching assembly having a first state in which the receive oscillator is coupled to the first and second receivers and a second state in which the receive oscillator is de-coupled from the second receiver and the transmit oscillator is coupled to the second receiver. The first receiver and the second receiver of the wireless communication device are able to operate independent of one another when the switching assembly is in the second state.

In accordance with a further embodiment; the present invention includes a processor operable to identify a communication mode of the wireless communication device and place the switching assembly in the second state in response to identifying a communication mode that at least temporarily does not utilize the transmitter.

In accordance with another feature of the present invention, the communication mode that at least temporarily does not utilize the transmitter is an initial cell search, an idle mode, a neighbor cell monitoring gap in a traffic mode, a Multimedia Broadcast Multicast Service monitoring of neighbor cell mode, a Multimedia Broadcast Multicast Service monitoring of unicast cell mode, or a traffic reception mode.

In accordance with an additional feature, the processor is operable to determine an acceptable coverage condition and a poor coverage condition and place the switching assembly in the second state in response to determining an acceptable coverage condition.

In accordance with yet another feature, the processor is further operable to place the switching assembly in the first state in response to determining a poor coverage condition.

In accordance with yet a further feature, the processor is operable to operate the first receiver and collect coverage statistics S1, operate the first receiver and the second receiver and collect statistics S2, determine the poor coverage condition if coverage statistics S2 exceed coverage statistics S1, and determine the acceptable coverage condition if coverage statistics S2 do not exceed coverage statistics S1.

The present invention, according to yet another feature, is able to sample a first data rate, compare the first data rate to a first threshold value, and place the switching assembly in the second state in response to the receive data rate being less than the first threshold value.

The present invention, in accordance with yet a further feature, includes a method for switching receiver operations in a multi-receiver wireless communication device, where the method includes the steps of decoupling the receive oscillator from the second receiver in response to determining that the transmitter state at least temporarily does not utilize the transmitter and coupling the transmit oscillator to the second receiver in response to determining that the transmitter state at least temporarily does not utilize the transmitter.

In accordance with a further feature, an embodiment of the present invention includes operating the first receiver and the second receiver of the wireless communication device independent of one another in response to determining that the transmitter state at least temporarily does not utilize the transmitter.

Other features that are considered as characteristic for the invention are set forth in the appended claims.

Although the invention is illustrated and described herein as embodied in a method and system for utilizing a transmit local oscillator for improved cell search and multi-link communication in a multi-mode device, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
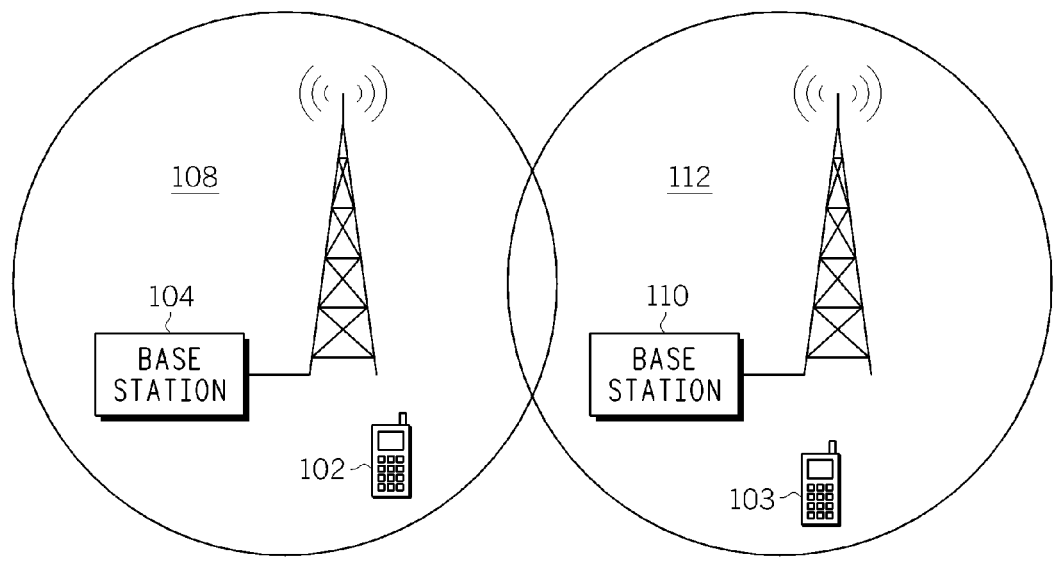
FIG. 1 is an illustration of wireless devices communicating on networks in accordance with an exemplary embodiment of the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing FIGS., in which like reference numerals are carried forward.

The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

Embodiments of the present invention advantageously make use of the transmit LO of a MIMO WCD any time there is no transmitter activity. By shifting the transmit LO to one of the two receive channels, the WCD is able to tune to a different frequency, band, or bandwidth and exploit the macro-diversity of a multiple-receiver device in a multi-Access Point (AP)/Base Station (BS) context. In addition to their normal function (receiver diversity, MIMO, etc.), the diversity receivers can also be used to speed up the search for neighbor cells and other radio access technologies (RAT).

The present invention utilizes a MIMO mobile WCD that implements multiple radio front-ends for supporting single-link or multi-link modes where the mobile device is maintaining links to multiple distinct APs/BSs (not necessarily using the same technology). Advantageously, the RF front-end can easily switch from one mode to the other (MIMO/Multi-Link) at a minimum complexity increase. In other words, the present invention extends the utility of traditional RF-front-ends from pure MIMO functionalities to MIMO/Multi-Link functionalities with just a slight modification of the RF-front-end.

System Diagram

The following drawings will be helpful in understanding the present invention. Turning now to FIG. 1, a diagram of one embodiment of a network 100, in accordance with the present invention is shown. A WCD 102 is illustrated. The WCD 102 communicates with a first Base Station (BS) Subsystem 104 to link to other WCDs 103. BSs are the parts of a network 300 that are responsible for facilitating wireless communication between a WCD 102 and the network 100. The BS 104 establishes service areas in the vicinity of the BS 104 to support wireless mobile communication, as is known in the art. In the case of a wireless local area network (WLAN) using, for example, WiMAX or WiFi, the BSs are called Access Points (AP).

Each BS 104 contains transceiver equipment, including a transmitter and a receiver coupled to an antenna 106, for transmitting and receiving radio signals and is responsible for providing service to an area commonly referred to as a "cell". In the exemplary network 100, the first BS 104 provides service to a first cell 108.

The network 100 also as at least one other BS 110 that serves a geographic area, or cell, 112 that is different from the area served by the first BS 104. Therefore, when a WCD 102 is in the first cell 108, if will receive service from the first BS 104. Likewise, when the WCD 102 is in the second cell 112, it will receive service from the second BS 110.

Most coverage areas are set up so that a WCD 102 is able to receive service from one BS and, prior to leaving the cell serviced by that BS, establish a connection to a second BS. In other words, most networks 100 are set up so that their cell coverages overlap. This overlap 112 is shown in FIG. 1 between the cells 108 and 112.

In telecommunications, a diversity scheme refers to a method for improving the reliability of a signal by utilizing two or more communication channels with different characteristics. Diversity is based on the fact that individual channels experience different levels of fading and interference and plays an important role in combating fading and co-channel interference and avoiding error bursts. Multiple versions of the same signal may be transmitted and/or received and combined in the receiver. If the antennas are at far distance, for example at different cellular base station sites or WLAN access points, this is called macrodiversity.

Referring to the network of FIG. 1, the WCD 102 can receive macrodiversity signals from both the first BS 104 and the second BS 110 or diversity signals from any other BS in the system 100. Embodiments of the present invention provide, in conditions where the transmitter is not in use, diverting the transmitter LO to one of the receivers, automatically switching from MIMO operation, which is communication with a single BS 104, to utilizing each receiver independently so that each is able to communicate with a separate BS 104 (or separate access point when in WLAN coverage). The use of the at least two MIMO receivers, in a multi-link configuration, where the WCD 102 is maintaining multiple links to distinct AP/BS simultaneously is referred to herein as a MIMO/SISO (Single-Input, Single-Output) mode.

Mobile Transmitter

Figure 2:
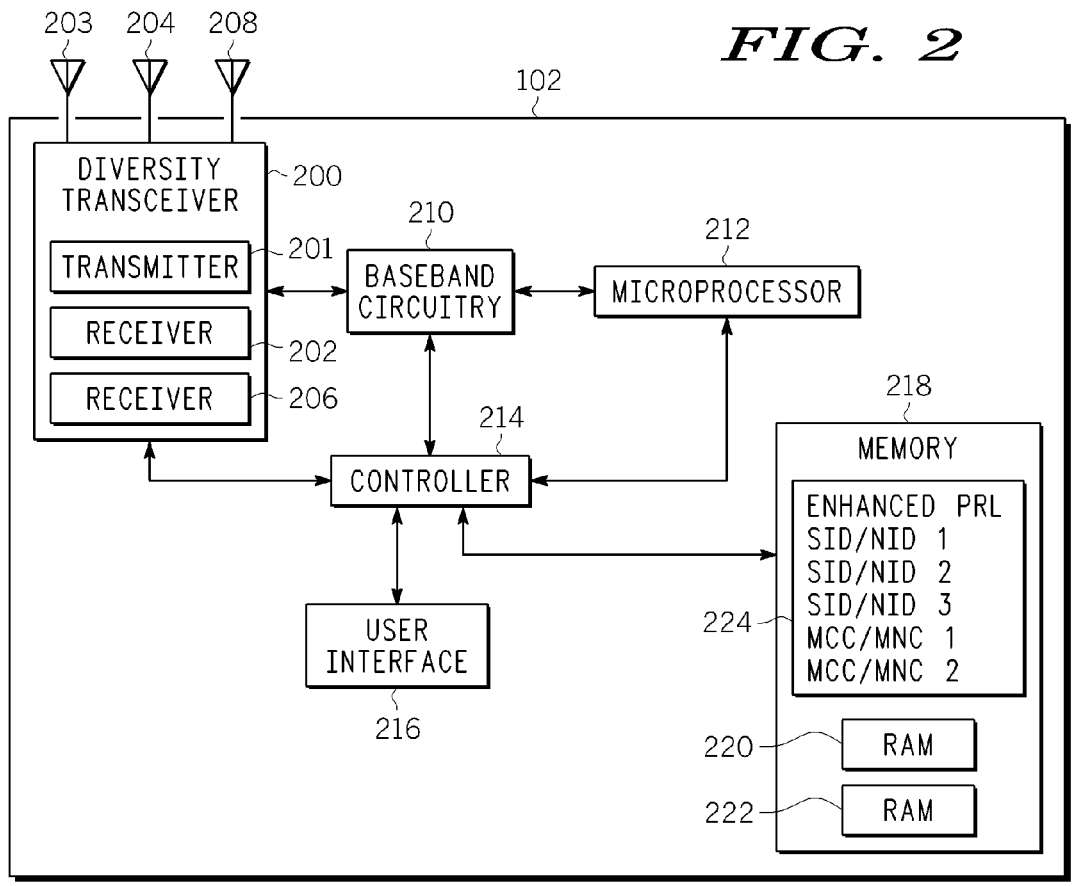
FIG. 2 is schematic block diagram of a wireless communication device, in accordance with an exemplary embodiment of the present invention.

FIG. 2 shows a block diagram of a WCD 102 having a diversity transceiver 200 according to exemplary embodiments of the present invention. The diversity transceiver 200 has a transmitter 201 with a transmitting antenna 203. The transceiver 200 also has a first receiver 202 with a corresponding first antenna 204 and a second receiver 206 with a corresponding second antenna 208. As will be shown in the schematic diagram of FIG. 4, the receiving antennas 204, 208 of the diversity receiver 200 can be decorrelated. The WCD 102 in one embodiment is a Code Division Multiple Access (CDMA) cellular telephone. Alternate WCDs, such as cellular modems, personal digital assistants (PDAs) with wireless interfaces, pagers, and other devices can be substituted for the cellular telephone shown. Additionally, other radio access technologies such as GSM, GPRS, UMTS, WiMAX, and LTE, can be substituted for CDMA in the WCD 102. The WCD 102 includes baseband circuitry 210, a microprocessor 212, a controller 214, and a user interface 216 that includes components such as a keypad, a display, a loudspeaker, and a microphone.

Additionally, the WCD 102 includes a memory block 218. The memory block 218 can be implemented as a memory that is not intended to be removed from the WCD 102, as a User Interface Module (UIM), as a Removable User Interface Module (RUIM), or as another type of memory unit. The memory block 218 includes an enhanced preferred roaming list (PRL) 224. The enhanced PRL 224 includes at least one mobile country code (MCC) with or without an optional Mobile Network Code (MNC or IMS1_11_12). The enhanced PRL 224 may also include a system identifier (SID) with or without an optional network identifier (NID). These codes are referred to as MCC/MNCs and SID/NIDs, Other memory in the memory block 218 can include random access memory (RAM) 220 and read-only memory (ROM) 222. The receivers 202, 206, when in the non-diversity mode, can employ communication at different frequencies and/or different protocols.

WCD Transceiver

Figure 3:
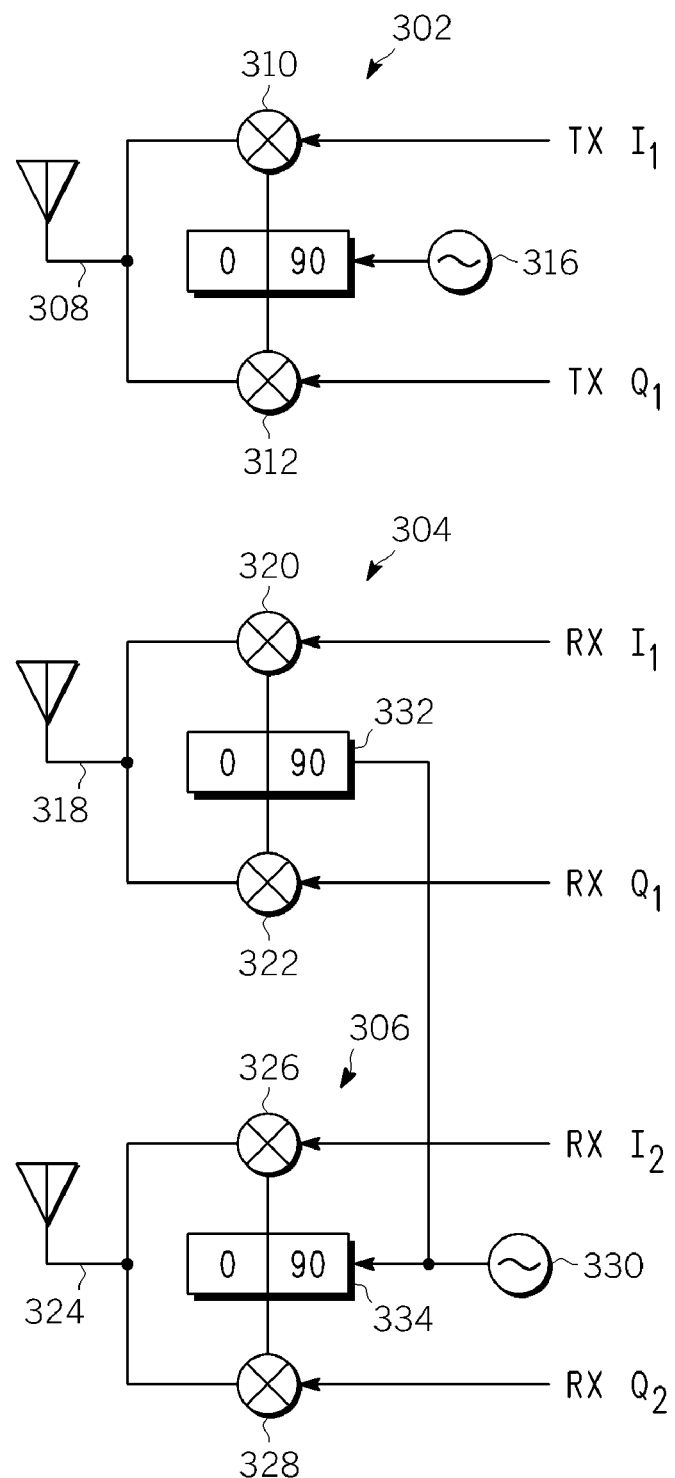
FIG. 3 is a schematic diagram of a prior-art multi-receiver transceiver.

FIG. 3 shows a schematic view of a prior-art transceiver 300. The prior-art transceiver 300 includes a transmitter 302, a first receiver 304, and a second receiver 306. The transmitter 302 has a transmit antenna 308. The antenna 308 is an impedance-matching device used radiate electromagnetic waves. The function of the antenna 308 is to "match" the impedance of the propagating medium, which is usually air or free space, to the source, the WCD 102. Accordingly, the transmit antenna 308, upon receiving signals from a pair of mixers 310 and 312, launches the signals into the air. The mixers 310 and 312 are each driven by a single LO 316 and are 90 degrees out of phase from one another.

The prior-art transceiver 300 also includes a first receive antenna 318 coupled to first 320 and second 322 mixers of the first receiver 304 and a second receiver antenna 324 coupled to first 326 and second 328 mixers of the second receiver 306. The receivers 304 and 306 are driven from a single LO 330. The output of the single LO 330 is fed to a pair of 90 degree hybrids 332 and 334. Hybrid 332 drives mixer 320 and mixer 322 ninety degrees out of phase from one another and hybrid 334 drives mixer 326 and mixer 328 ninety degrees out of phase from one another.

Because both receivers are driven from the same LO 326, both receivers operate at the same frequency. This sharing of the LO 326 means that the receivers cannot be used to tune to different frequencies, bands, or band widths. In other words, the prior-art configuration fails to exploit the macro-diversity of a multiple-receiver device in a multi-Access Point (AP)/Base Station (BS) context.

MIMO transmissions, e.g., based on Space-Time codes as defined in the 802.11n standard, require longer physical layer preambles in order to enable the receiver to estimate the channel impulse responses between each of the transmit/receive antennas. The corresponding overhead can be important, in particular for communications of small data packages, such as those that occur in the context of Voice over Internet Protocol (VoIP) communications.

If the objective is to transmit a given data package at a minimum level of emission energy, it is expected that in the VoIP case it is often better to use SISO (Single Input Single Output) modes at a higher emission power, such that the global emission energy is identical to the MIMO case, i.e., from a power-budget point of view, the MIMO transmission is not always the best choice.

In particular, for VoIP calls, the MIMO radio systems proposed in many modern standards are not adapted to the user's needs. Calibrating the channel in a MIMO system requires preambles that are longer than in mono-antenna systems. When the payload of the data packet to be transmitted is small, the preamble itself dominants the on-air activity. In that case, it is better to use a mono-antenna mode with a short preamble at a lower data rate than to use an advanced high data rate MIMO mode—because the on-air time will be shorter. This is a case that arises in the use of VoIP on MIMO systems.

In a mobility context where the user and/or environment are moving, abrupt shadowing effects are common, e.g., when device moves around a corner or cars move around device. This often leads to repeated interruptions in communication. However, users demand mobile voice communication hardware and techniques that will provide seamless handovers when one link breaks. The capability to use both receivers independently without the addition of a dedicated receive LO would be beneficial.

WCD Transceiver Sharing TX LO

Figure 4:
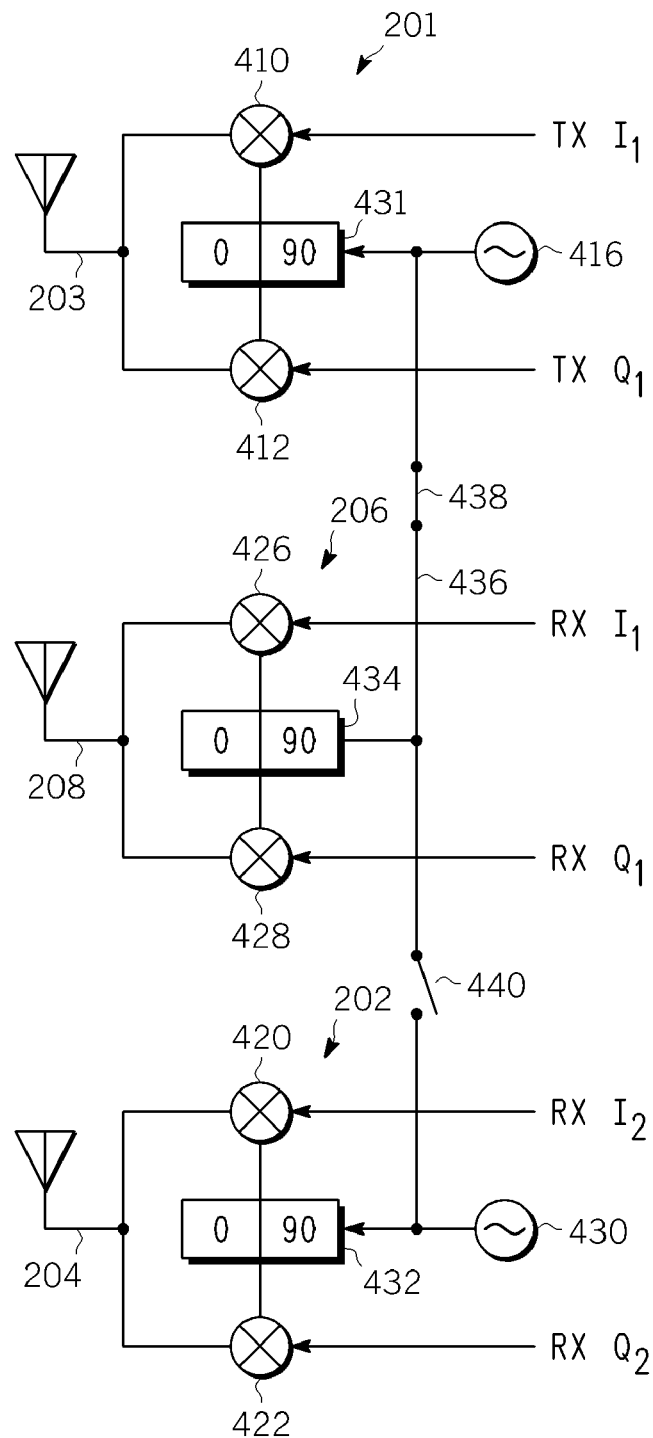
FIG. 4 is a schematic diagram of a multi-receiver transceiver, in accordance with an exemplary embodiment of the present invention.

FIG. 4 shows a schematic diagram of an exemplary embodiment of the presently inventive transceiver 400. The schematic view shows the presence of a transmitter 201 for transmitting signals to nearby BSs/APs and a first receiver 202 and second receiver 206 for MIMO diversity reception and MIMO/SISO independent operation. Similar to the transceiver 302 shown in FIG. 3, transceiver 400 includes a transmit antenna 203 coupled to the transmitter 201. The transmit antenna 203 receives signals from a pair of mixers 410, 412 and radiates electromagnetic waves into the air. The mixers 410, 412 are each driven by a single LO 416 and are ninety degrees out of phase from one another.

The transceiver 400 also includes a first receive antenna 204 coupled to first 420 and second 422 mixers of the first receiver 202 and a second receiver antenna 208 coupled to first 426 and second 428 mixers of the second receiver 206. The receivers 202, 206 are driven from a single LO 430. The output of the single LO 430 is fed to a pair of ninety degree hybrids 432 and 434. Hybrid 432 drives mixer 420 and mixer 422 ninety degrees out of phase from one another and hybrid 434 drives mixer 426 and mixer 428 ninety degrees out of phase from one another.

The inventive transceiver 400 advantageously also includes a conductive signal path 436 that, during times of transmitter 201 non-use, couples the transmitter LO 416 directly to the second receiver 206, while at the same time, decouples the receiver LO 430 from the second receiver 206. The transceiver 400, thereby provides each receiver 202, 206 with its own LO and allows each receiver to engage in independent operation.

More specifically, the signal path 436 has a first switch 438 located between the transmit LO 416 of the transmitter 201 and the second receiver 206. When the switch 438 is in a closed position, as shown in FIG. 4, a communication path is created from the transmit LO 416 of the transmitter 201 directly to the 90 degree hybrid 434 of the second receiver 206. Alternatively, when the switch 438 is in the open position, the transmit LO 416 of the transmitter 201 is applied directly to the 90 degree hybrid 431 of the transmitter 201. Of course, in other circuit arrangements, the first switch 438 could operate in reverse states as that described here.

The signal path 436 also includes a second switch 440. The second switch 440 of the signal path 436, when in an open position, as shown in FIG. 4, disconnects the transmit LO 416 from the second receiver 206, while keeping it connected to the first receiver 202. The second switch 440 provides the first receiver 202 with its own oscillator, thereby allowing the first receiver 202 to be tuned to a different frequency, frequency band, or bandwidths as the second receiver 206, which is driven by LO 416. In other words, circuit configuration 400 of FIG. 4 advantageously exploits the macro-diversity of the multiple-receiver device in a multi-Access Point (AP)/Base Station (BS) context by providing two independent receivers. The first switch 438 and second switch 440 form a switching assembly. Of course, in other circuit configurations, the second switch 440 could operate in reverse states as that described here. In still other circuit configurations, the first 438 and second 440 switches can be embodied in a single switch that, upon switch operation, opens an electrical path between the receive LO 430 and the second receiver 206 and closes a path between the transmit LO 416 and the second receiver 206 and vice-versa. The first 438 and second 440 switches can also be embodied in more than two switches.

The circuit of FIG. 4 can be used for any low-rate application, such as VoIP, where the overhead for the MIMO preamble required for the channel estimation outweighs the data that needs to be sent for the application. More specifically, the second receiver 206, enabled by the transmit LO 416 can be used to scan frequencies for new access points/BSs to switch to, then to associate with the new access point/BS, and to be ready to act as the primary connection for the VoIP link when the primary system goes down or out of range.

By advantageously utilizing the transmit LO 416, the present invention avoids the addition of a second receive LO. This use of the transmit LO is a great benefit from a complexity and cost standpoint.

Figure 5:
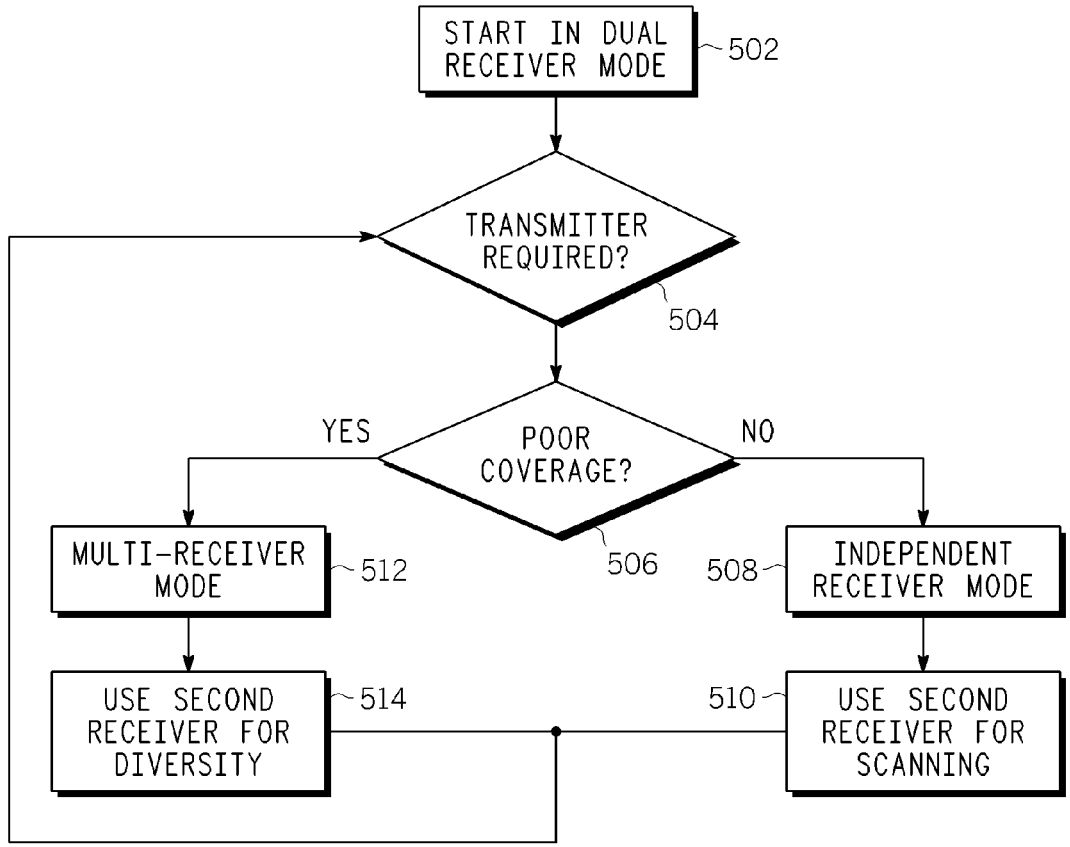
FIG. 5 is a process flow diagram illustrating a mode and coverage determination process, in accordance with an exemplary embodiment of the present invention.

FIG. 5 shows a process flowchart 500 for using transceiver 200 of WCD 102 of FIG. 1, according to an embodiment of the present invention. This process 500 can be implemented using software in the microprocessor 212 of the transceiver 200 shown in FIG. 2. This embodiment shows two CDMA receivers; however, these teachings can be expanded to use more than two receivers as well as reception technology other than CDMA.

The flowchart 500 starts at step 502 in a first switching state where the first switch 438 of the conductive path 436 is open and the second switch 440 is closed. The open first switch 438 opens the conductive path from the transmit LO 416 to the second receiver 206 and decouples the transmit LO 416 from the second receiver 206. The closed second switch 440 couples the receive LO 430 to the second receiver 206. The two receivers 202, 206 are now correlated and will operate at the same frequency.

Step 504 determines if the WCD 102 is in a mode that does not immediately require use of the transmitter 201. Examples of situations where the LO 416 of the transmitter 201 can be used to operate one of the receivers independent of the other receiver and the dedicated channel reception is not degraded includes initial cell search, neighbor cell search during idle mode, idle slots/frames, or compressed mode gaps. Idle mode, neighbor cell monitoring gaps in traffic mode, traffic mode with service reception, Idle mode camped situations, foreground scanning mode situations. Multimedia Broadcast Multicast Service (MBMS), and others. If step 504 determines that use of the transmitter 201 is needed, the flow returns to step 504 until the outcome of step 504 changes.

However, even though the WCD 102 can operate in a mode that does not require immediate use of the transmitter, coverage should be sufficient so that at least one of the two receivers operating independently is able to receive a reliable signal. Therefore, step 506 determines if the WCD 102 is experiencing poor coverage. The poor coverage determination step 506 will be expanded with respect to FIG. 6.

If the WCD 102 is not experiencing poor coverage, in step 508, a second switching state is entered where the first switch 438 couples the transmit LO 416 to the second receiver 206 and the second switch 440 decouples the receive LO 430 from the second receiver 206. Each transmitter 202, 206 can now be used to locate available cell service. In step 510, the WDC 102 uses the second receiver 206 for either foreground or background scanning, depending on the mode of the WCD 102. It is noted that the "second receiver" is simply any receiver other than the first receiver. Thus, if the WCD 102 is in good coverage, both receivers 202, 206 will independently scan channels to find service, getting through the list as quickly as possible.

If the WCD 102 is experiencing poor coverage, as determined in step 506, step 512 places, or ensures that, the WCD 102 is in a dual-receiver mode as described in connection with step 502. Step 514 uses the second receiver 206 for diversity to maximize the ability of the WCD 102 to pull in marginal signals. Of course, the first receiver 202 is also needed for diversity reception.

Periodically, step 510 and step 514 return to step 504 to re-evaluate the mode and coverage situation of the WCD 102. Because the WCD 102 may he changing communication mode or status and also may be changing geographic locations, the network may be experiencing different loading conditions, and/or the environment of the WCD 102 may be variable. Periodic mode and coverage re-determination allow the process 500 to deploy the second receiver 206 more efficiently for either diversity reception to improve coverage or for scanning to reduce current drain. It is noted that the periodicity of the coverage re-determination can vary depending on, for example, a trigger (e.g., in step 510 the second receiver has completed scanning of a predetermined number of channels), an elapsed time period that can depend on what mode the WCD 102 is in (e.g., idle mode or traffic mode), or the "poorness" of the coverage. The mode re-determination can be stimulated by the processor 212 recognizing a mode change.

Figure 6:
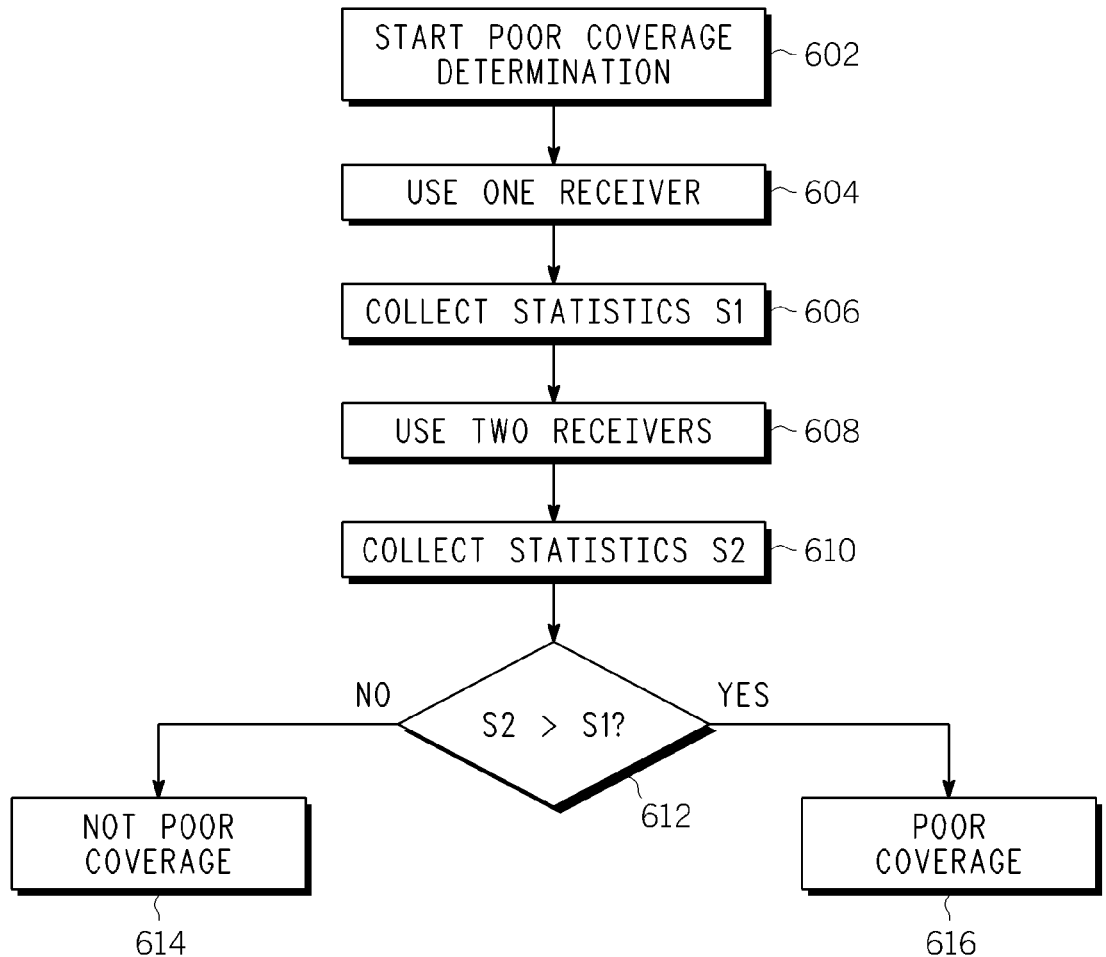
FIG. 6 is a process flow diagram illustrating a coverage condition determination process, in accordance with an exemplary embodiment of the present invention.

FIG. 6 shows a flowchart 506 for determining poor coverage according to one embodiment of the present invention. Step 602 starts the poor coverage determination. Step 604 uses one receiver (such as the first receiver 202 shown in FIGS. 2 & 4), and step 606 collects statistics S1 using the one receiver over a first predetermined time period T1. Depending on the implementation, the statistics S1 can be packet erasure rate, frame erasure rate, bit error rate, the average power of a carrier channel over total signal power ($E_C/I_O$), energy per bit over noise ($E_B/N_O$), received signal strength indication (RSSI), other statistics, the rate of change of one or more of the statistics, or a combination of statistics.

After statistics S1 are collected, step 608 uses two receivers (such as the first receiver 202 and second receiver 206 shown in FIGS. 2 & 4) and step 610 collects statistics S2 using both receivers over a second predetermined time period T2. The statistics S2 should be the same type of statistics as statistics S1 so that they can be compared. The second predetermined time period T2 can he equal to or different from the first predetermined time period T1.

Step 612 compares the two statistics S1 and S2. If statistics S2 is significantly larger than statistics S1, step 616 determines that the WCD 102 is experiencing poor coverage. If statistics S2 is not significantly larger than statistics S1, step 614 determines that the WCD 102 is experiencing acceptable (i.e., not poor) coverage. The determination of "significantly larger" can be implemented using absolute numbers (e.g., S1 is less than a predetermined value and S2 is greater than a predetermined value), arithmetic ratios (e.g., S2 is more man three times S1), logarithmic ratios, or other comparisons depending on the type of statistics collected as well as the sensitivity and power efficiency of the multiple receivers.

Figure 7:
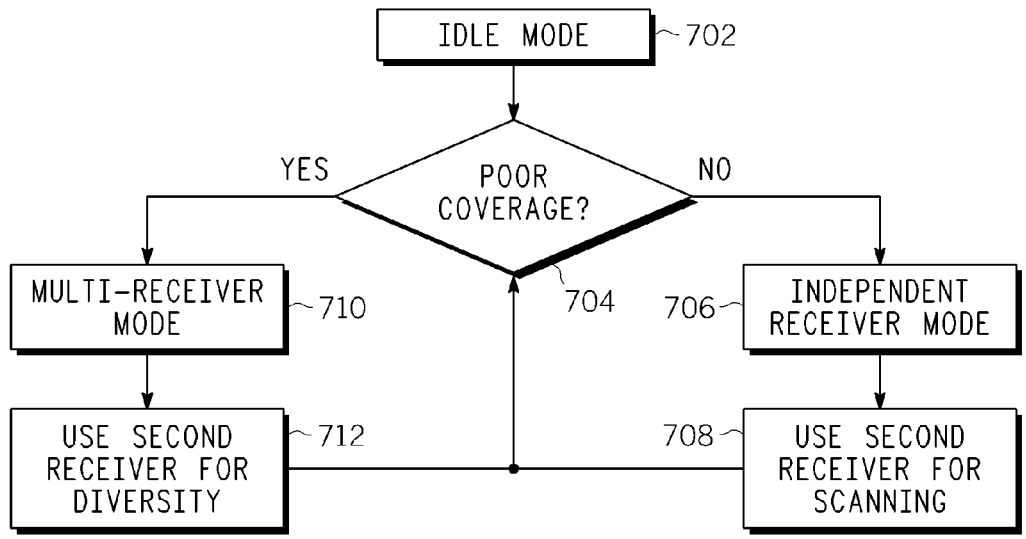
FIG. 7 is a process flow diagram illustrating a process for placing a wireless communication device into an independent multi-receiver mode during an idle mode, in accordance with an exemplary embodiment of the present invention.

FIG. 7 shows a process flow where one of the WCD 102 modes determined in step 504 of FIG. 5 is an idle mode. During idle mode, the WCD 102 is not in a call, so the transmitter 201 is not in use. In this mode, the WCD 102 monitors various control channels of a system. In step 702 the WCD 102 is in the idle mode with a first receiver (such as receiver 202 in FIGS. 2 & 4) monitoring control channels of a system. Step 704 determines the coverage quality the WCD 102 is experiencing. Step 704 can be implemented using the flow chart 506 shown in FIG. 6.

If the WCD 102 is experiencing adequate coverage, in step 706, the first switch 43S couples the transmit LO 416 to the second receiver 206 and the second switch 440 decouples the receive LO 430 from the second receiver 206. Each transmitter 202, 206 can now be used independently. Step 708 then uses the second receiver for background scanning while the first receiver continues to monitor the appropriate control channels.

If step 704 determines that the WCD 102 is experiencing poor coverage, in step 710, the first switch 438 decouples the transmit LO 416 from the second receiver 206 and the second switch 440 couples the receive LO 430 to the second receiver 206. The transmitters 202, 206 are now driven by the same LO 430. Step 712 uses the first and second receivers (such as receivers 202 and 206 in FIGS. 2 & 4) for diversity reception.

Step 708 and step 752 flow back to step 704 periodically to re-determine the coverage situation. Returning to step 704 may be caused by changes in channel statistics (such as RSSI), paging message errors, or a timer.

Figure 8:
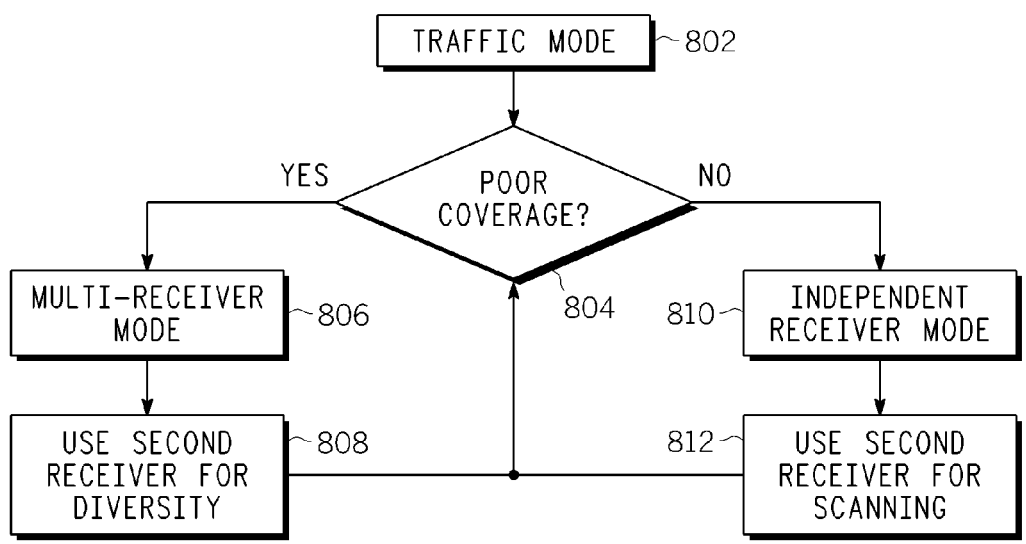
FIG. 8 is a process flow diagram illustrating a process for placing a wireless communication device into an independent multi-receiver mode during a traffic mode, in accordance with an exemplary embodiment of the present invention.

FIG. 8 shows a process flow 800 where one of the WCD 102 modes determined in step 504 of FIG. 5 is a traffic mode. During traffic mode, a first receiver (such as receiver 202 in FIGS. 2 & 4) is in a call and is tuned to a specific traffic channel and is receiving or expecting to receive signals. Step 802 has the WCD 102 in traffic mode with a first receiver tuned to a traffic channel. Step 804 determines if the WCD 102 is experiencing poor coverage. Step 802 can be implemented using the flow chart 506 shown in FIG. 6.

If the WCD 102 is experiencing poor coverage, in step 806, the first switch 438 decouples the transmit LO 416 from the second receiver 206 and the second switch 440 couples the receive LO 430 to the second receiver 206. The transmitters 202, 206 are now driven by the same LO 430. Step 808 uses the second receiver 206 for diversity reception on the traffic channel. Of course, the first receiver is also used for diversity.

If the WCD 102 is not experiencing poor coverage, in step 810, the first switch 438 couples the transmit LO 416 to the second receiver 206 and the second switch 440 decouples the receive LO 430 from the second receiver 206. Each transmitter 202, 206 can now be used independently. Step 812 then uses the second receiver for background scanning while the first receiver is timed to the traffic channel. If background scanning is not necessary the second receiver may be powered down to save power.

Step 808 and step 812 flow back to step 804 periodically to re-determine the coverage situation. Returning to step 804 may be caused by changes in channel statistics (such as RSSI), paging message errors, or a timer.

Figure 9A:
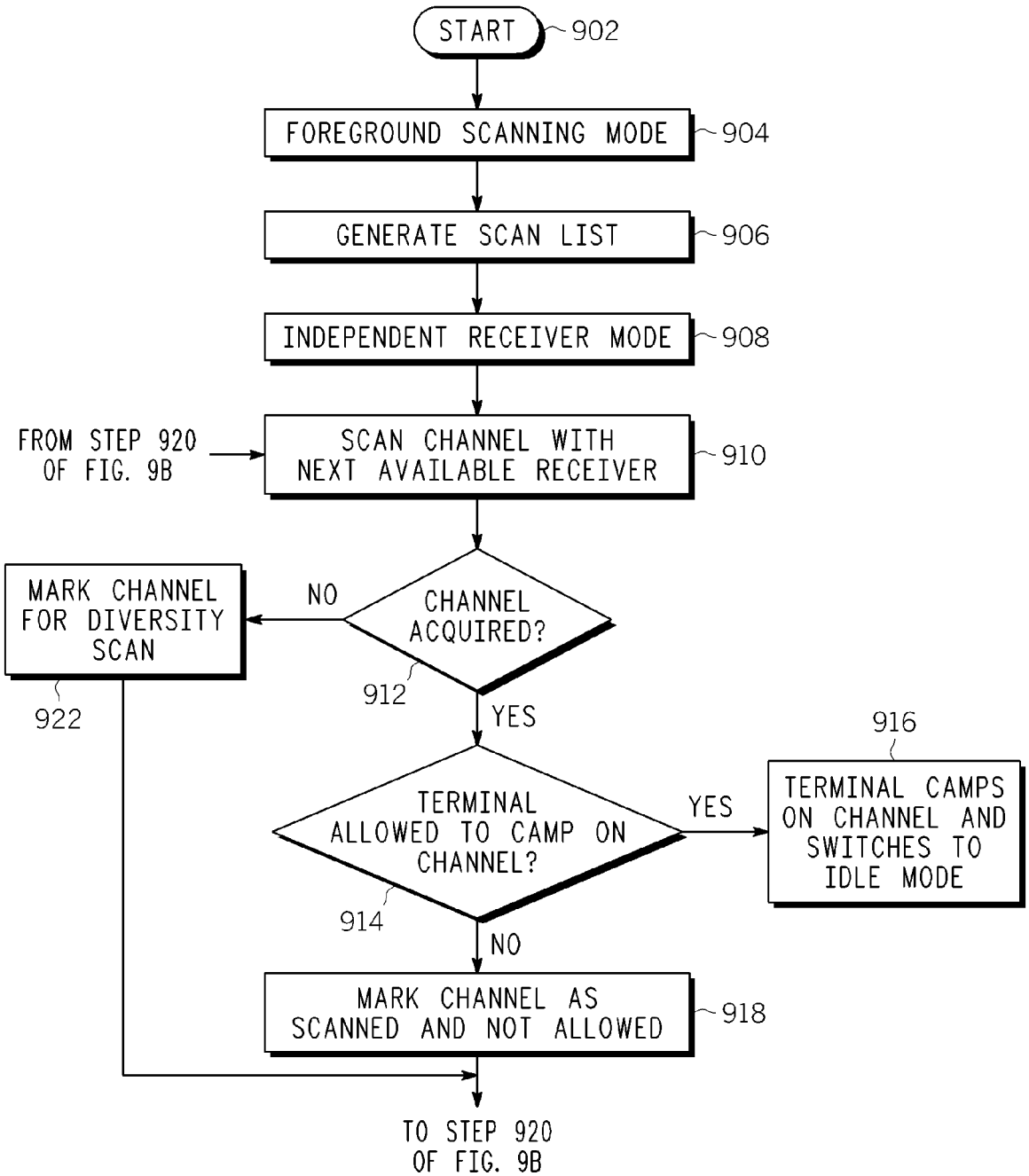
FIGS. 9A and 9B are a process flow diagram illustrating a process for placing a wireless communication device into an independent multi-receiver mode during an initial cell foreground scanning mode, in accordance with an exemplary embodiment of the present invention.
Figure 9B:
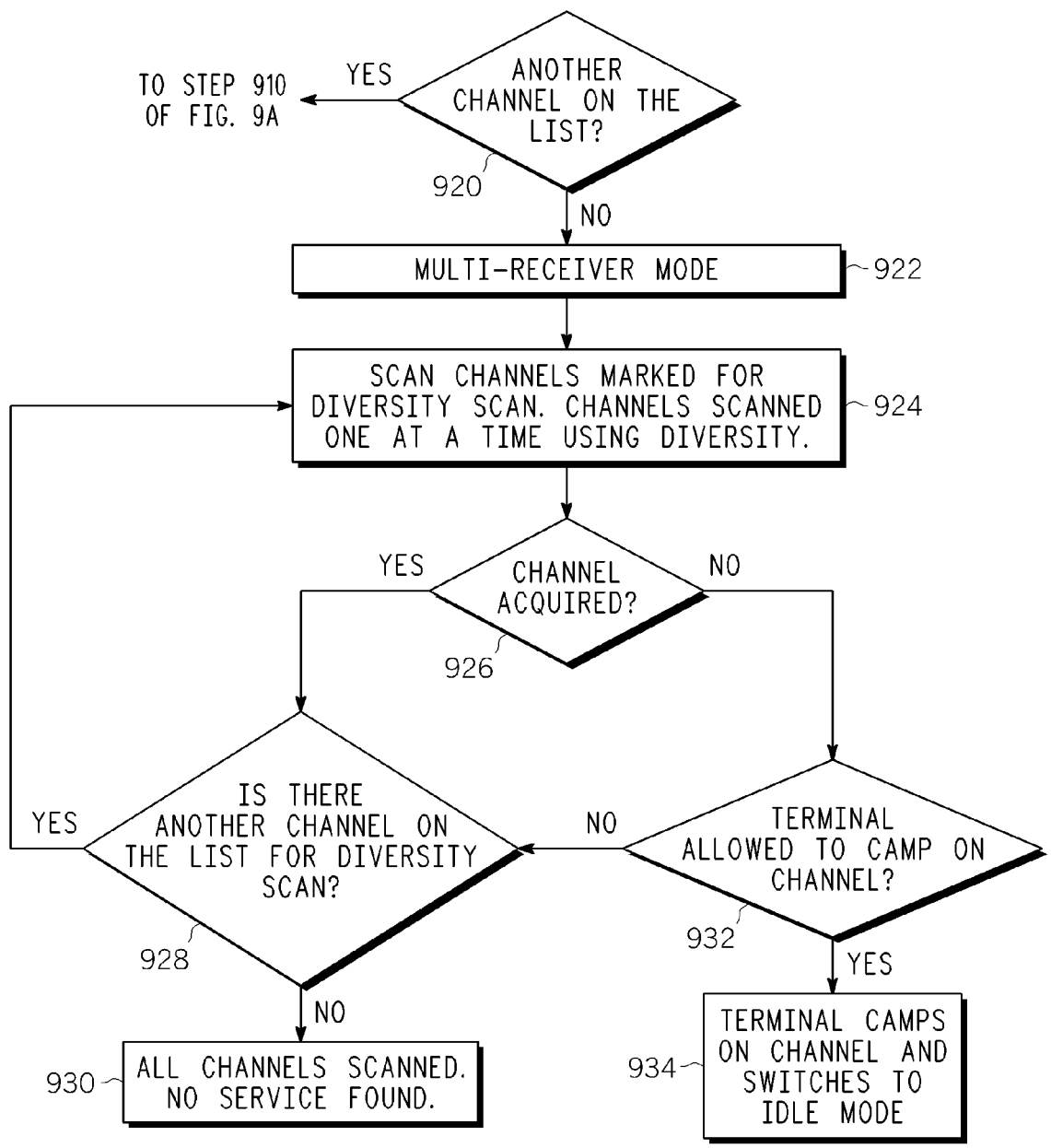

FIG. 9 shows a flowchart 900 for using the transceiver 400 of FIG. 4 according to an embodiment of the present invention. The flow of FIG. 9 is tailored to a WCD 102 in an initial cell foreground scanning mode. In this mode, none of the receivers of the WCD 102 are in either idle mode or traffic mode. Generally, foreground scanning mode occurs when the WCD 102 is powered on or the WCD 102 has encountered a situation where no signals can be located and thus cannot camp on a system in idle mode.

The flow starts at step 902 and moves directly to step 904 where the WCD 102 enters the foreground-scanning mode. This typically occurs when the unit is powered on and needs to find service. In step 906, the WCD 102 generates a scan list for finding service. In step 908, the first switch 438 couples the transmit LO 416 to the second receiver 206 and the second switch 440 decouples the receive LO 430 from the second receiver 206. Each transmitter 202, 206 can now be used to locale available cell service.

In step 910, the first receiver 202 of the WCD 102 scans a first channel on the list. If a channel is acquired, as determined by step 912, the WCD 102 in step 914 will determine if it is allowed to camp on the channel. If the WCD 102 is allowed to camp on the recently acquired channel, then step 916 switches the WCD 102 to idle mode and foreground scanning ends. If step 914 determines that the WCD 102 is not allowed to camp on the newly acquired channel, then the flow continues to step 918, and the WCD 102 marks the channel as scanned and not allowed. In step 920, the WCD 102 determines if other channels remain to be scanned on the list.

If step 912 determines that the scanned channel cannot be acquired, then step 922 marks the channel as a diversity scanning candidate, and the WCD 102 will go to step 920. If channels remain to be scanned, then the flow returns to step 910. At this time, whichever receiver 202, 206 is free will scan the next channel on the list. Thus, the WCD 102 will have both receivers independently scanning channels from the scan list searching for a system to camp on.

Once all the channels on the scan list have been scanned using a single receiver at a time, the flow continues to step 922 where the first switch 438 decouples the transmit LO 416 from the second receiver 202 and the second switch 440 couples the receive LO 430 to the second receiver 202. The two receivers 202, 206 are now correlated and will operate at the same frequency.

Now that the two receivers are again sharing the receive LO 430, in step 924, the WCD 102 uses diversity to scan any diversity channel candidates marked hack at step 922. While not shown, it is noted that, if there are no diversity channel candidates, the flow will jump to step 930. If at least one channel was marked for diversity scanning, then step 924 will use both receivers 202, 206 to scan a channel from the diversity candidate list. Step 926 determines if a channel was acquired. If a channel is not acquired, the flow continues to step 928 to determine if another diversity candidate channel is available on the list for a diversity scan. If another diversity candidate channel exists, the flow continues to step 924 and the next diversity candidate channel on the list is scanned.

If a channel is acquired at step 926, then the WCD 102 determines if it may camp on the channel in step 932. If the WCD 102 can camp on that channel, then flow continues to step 934, where the WCD 102 camps on the channel and switches to idle mode. If the WCD 102 is not allowed to camp on the channel, then flow goes to step 928.

At step 930, all channels have been scanned with a single receiver or MIMO diversity and no service has been found. At this point, depending on the rules governing system selection of the WCD 102, the unit may build anew scan list and start the process over from step 906 or it may wait for a period of time before re-attempting to find service.

Thus, the inventive WCD 102 uses the transmitter LO 416 during transmitter downtime to drive, in combination with the receive LO 440, the two receivers 202, 206 independently to scan a list to find service as quickly as possible and then re-scan channels that were not originally found using diversify to maximize the ability to receive a signal. Other methods of interleaving simplex and diversity scanning can be used.

The initial cell search, as described above with reference to FIG. 9 potentially speeds up initial cell synchronization and reduces the time required to camp on a channel. Use of the independent receivers 202, 206 before frame synchronization per base station is advantageous because, typically, the benefit of diversity prior to synchronization is limited and correlation of signals from both antennas 204, 208 would not be expected. With limited benefit for diversity, using receivers independently should speed up search of different frequency bands and/or RATS (first order estimate of 2×). The present invention also can be used as an enabler for replacement of the currently-used temperature compensated crystal oscillators with a less expensive and larger frequency tolerance crystal. In one embodiment, this is performed by using both receivers 202, 206 at different frequency offsets to more effectively cover the tolerance of the reference oscillator.

Embodiments of the present invention are advantageously used for MBMS modes, where strong signals, such that diversity, are not needed. In these modes, uplink during MBMS reception is limited and the transmit LO 416 could be used for the second receive LO for a large portion of time. The second receiver 202 could be used for monitoring other MBMS or unicast cells.

Figure 10:
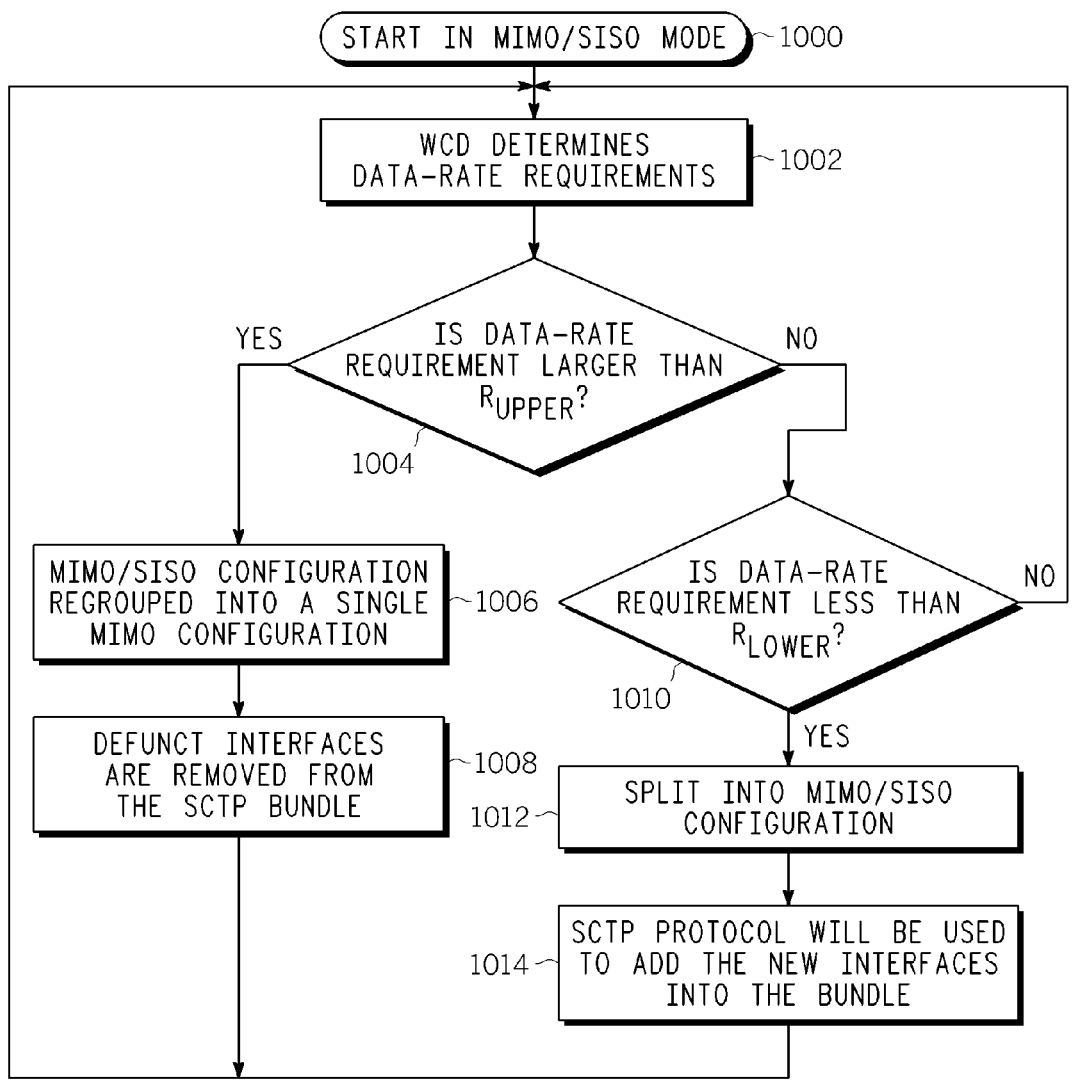
FIG. 10 is a flow diagram illustrating an algorithm used to determine when to change between MIMO and MIMO/SISO modes in accordance with an exemplary embodiment of the present invention.

FIG. 10 shows an algorithm used to determine when to change between MIMO and MIMO/SISO modes according to an exemplary embodiment of the present invention. In this embodiment, the algorithm is based upon the needs of the applications currently supported by the WCD 102. In one exemplary embodiment of the present invention, the change/transfer is performed in the protocol stack connected to the MIMO and MIMO/SISO systems. This protocol stack might perform the bundling of the systems in a multi-homed manner, like in a Stream Control Transmission Protocol (SCTP) or there might be separate protocol stacks for each system. As shown in the process flow diagrams of FIGS. 5 and 6, the algorithms will be slightly different in both cases.

If the application sees a single protocol stack grouped together by an SCTP protocol, then the situation is transparent for the application, and the process to split the MIMO system into a multiple-link MIMO/SISO systems or regroup the MIMO/SISO systems into a single MIMO system can be made entirely in the protocol stack.

Referring now to FIG. 10, an example of the presently inventive process is illustrated and starts at step 1000 with the system in a MIMO/SISO configuration. The flow moves directly to step 1002, where the WCD 102 averages the instantaneous data rate requirements in a moving average with a fixed window time. This step smoothes any peaks in the data rate. The window size might be, for example, 100 ms to 1 s.

Step 1004 determines whether the windowed data-rate requirement (both uplink and downlink) is larger than a limit $R_{upper}$. If the answer is yes, then, in step 1006, the MIMO/SISO systems are regrouped into a single MIMO system, and in step 1008, the defunct interfaces are removed from the SCTP bundle. The flow then returns to step 1002.

If, however, the windowed data, rate requirement (both uplink and downlink) is not larger than $R_{upper}$, step 1010 determines whether the windowed data-rate requirement is smaller than a limit $R_{lower}$, which will be smaller than $R_{upper}$. The distance between $R_{lower}$ and $R_{upper}$ prevents the device from rapidly switching between modes. If the answer to step 1010 is yes, then, in step 1012, the MIMO system remains, or is split into, the multiple MIMO/SISO configuration. In step 1014, the SCTP protocol will be used to add the new interfaces into the bundle and flow moves back up to step 1002.

If the new interfaces are presented as separate interfaces to the application, then the application itself will be required to make use of multiple interfaces and to be capable of reacting to a change in the network routing and multi-homing. The algorithm to determine whether to use MIMO or multiple MIMO/SISO systems, however, must still be determined within the protocol stacks themselves, as the decision is based on the total data rate requirement, and not the requirement of a single application. The process would, then, be that shown in FIG. 11.

Figure 11:
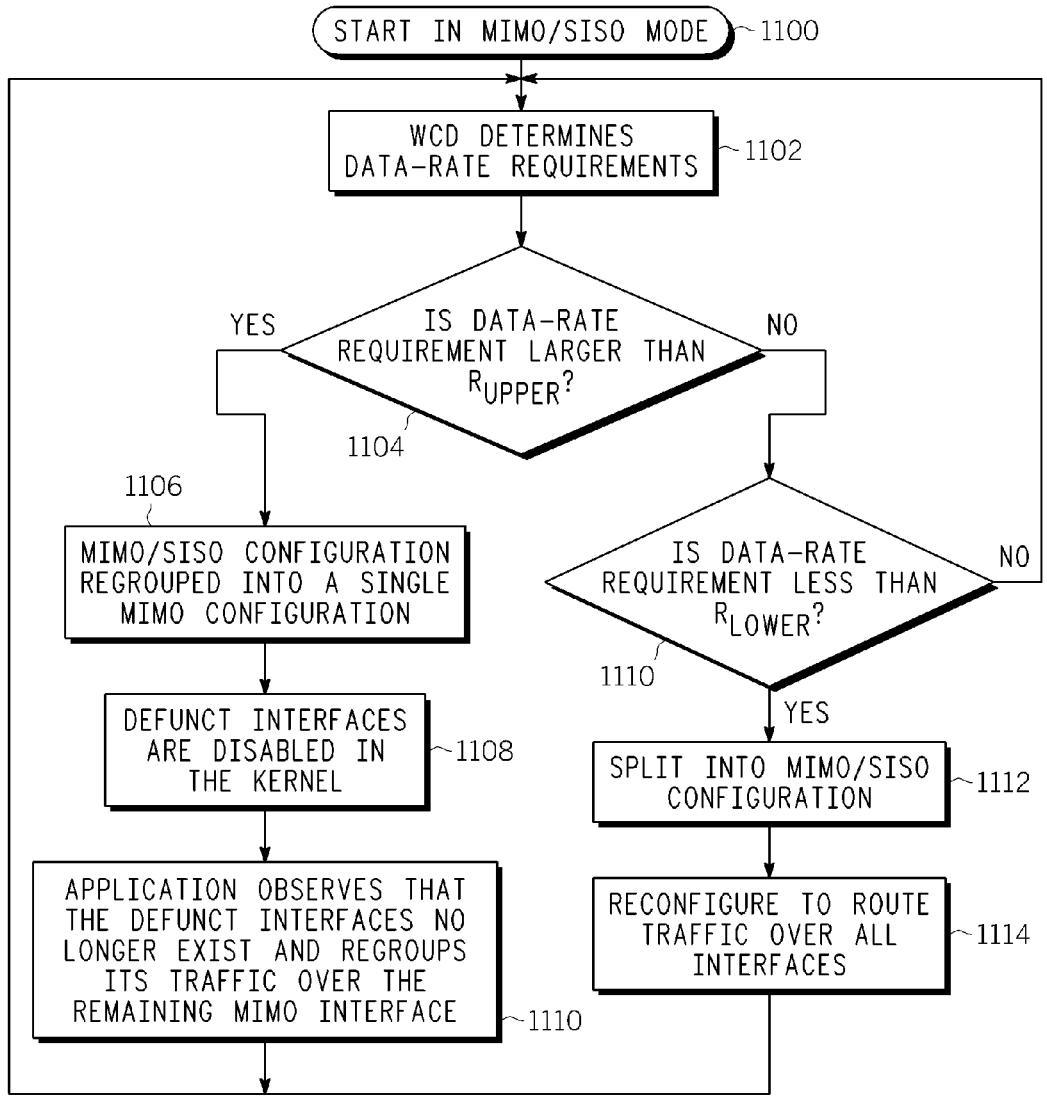
FIG. 11 is a flow diagram illustrating an algorithm used to determine when to change between MIMO and MIMO/SISO modes in accordance with an exemplary embodiment of the present invention.

The flow of FIG. 11 begins at step 1100 with the system in a MIMO/SISO configuration and moves directly to step 1102, where the WCD 102 averages the instantaneous data rate requirements in a moving average with a window time that is fixed. This step smoothes any peaks in the data rate. The window size might be 100 ms to 1 s, for example. This step can be performed by regrouping the data rate requirements of the MIMO/SISO interfaces into a single figure of merit.

Step 1104 determines whether the windowed data-rate requirement (both uplink and downlink) is larger than a limit $R_{upper}$. If the answer is yes, then, in step 1106, the MIMO/SISO systems are regrouped into a single MIMO system. In step 1108, the defunct interfaces are disabled in the kernel and, in step 1110, the application observes that the defunct interfaces no long exist and regroups its traffic over the remaining MIMO interface. The flow then returns to step 1102.

Alternatively, if the answer to step 1104 is no, the flow moves to step 1111, where it is determined whether the windowed data rate requirement (both uplink and downlink) is smaller than a limit $R_{lower}$, which will be smaller than $R_{upper}$. If the answer is no, then the flow moves back to step 1102. However, if the answer to step 1111 is yes, then flow moves to step 1112 and the unit remains, or is switched into, the MIMO/SISO configuration. The application then observes, in step 1114, that new network interlaces have appeared that might be used and reconfigures itself to routing its traffic over all of the interfaces.

In an IEEE 802.11n CSMA scheme, the mode used by the WCD 102 is chosen by the WCD 102 and can be changed on a packet-by-packet basis. Therefore, there will be no loss in the uplink from the terminal if an appropriate modulation is chosen from the MIMO/SISO mode. The downlink modulation might cause a problem if the mode change happens between the time the access point chooses its modulation based on channel and Received Signal Strength Indication (RSSI) measurements and the time the downlink packet is sent. For a VoIP application, a packet is sent every 20 ms, so there is a large amount of time to re-measure the downlink channel if the terminal changes its mode soon after reception of a VoIP packet.

For an IEEE 802.16 system, the terminal can only change its mode by requesting a new resource allocation. This happens in the contention slot at the end of the 802,16 frame, which is typically 5 ms long. Therefore, in the worst case, there is at least 10 ms of margin to allow the change to happen in the uplink/downlink modulation to ensure that no packets are lost. Other low-rate applications with a reasonable latency between packets to be sent (which is typically all low rate applications) can also be applied.

Conclusion

Embodiments of the present invention have just been described that advantageously enable a transmitter LO to be shifted to a second receiver in a multi-receiver device during times of transmitter non-use. Diverting the transmitter LO to the second receiver efficiently switches the device between a MIMO mode (operating at a single carrier frequency) and Multi-Link modes with distinct links (operating at distinct earner frequencies). The choice between MIMO and MIMO/SISO modes is based upon the required data rate of the application and the associated MIMO channel estimation overhead. In a low data-rate condition, the inventive communication scheme allows redundant data to be sent on the multiple links, i.e., separate MIMO channels, providing a redundant link that can be used to ensure continuity of the communication in the event of a link loss on one channel. Depending on the context of the user, it is then possible to choose between the following two classes of operational modes:

1. MIMO link to a single AP/BS—this is expected to be preferred in a static context where a sudden interruption and/or degradation of the links is unlikely; and
2. MIMI/SISO multi-link configuration—where the WCD is maintaining multiple links to distinct AP/BS simultaneously. The inherent macro-diversity is expected to be of advantage in a mobility scenario where a sudden interruption/degradation of a link may occur. In a practical context, it is expected that a WCD supports two to three antennas.

NON-LIMITING EXAMPLES

Reference throughout the specification, to "one embodiment" or to an "exemplary embodiment" means that a particular feature, structure, or characteristic described in connection with the embodiment is included in at least one embodiment of the present invention. Thus, the appearances of the phrases "in one embodiment" or in an "exemplary embodiment" in various places throughout the specification are not necessarily all referring to the same embodiment. Furthermore, the particular features, structures, or characteristics may be combined in any suitable manner in one or more embodiments. Moreover these embodiments are only examples of the many advantageous uses of the innovative teachings herein. In general statements made in the specification of the present application do not necessarily limit any of the various claimed inventions. Moreover, some statements may apply to some inventive features but not to others. In general, unless otherwise indicated, singular elements may be in the plural and vice-versa with no loss of generality.

The present invention may be realized in hardware, software, or a combination of hardware and software. Any kind of computer system—or other apparatus adapted for carrying out the methods described herein, such as microprocessor 212—is suited. A typical combination of hardware and software might be a general-purpose computer system with a computer program that, when being loaded and executed, controls the computer system in order to carry out the methods described herein.

The present invention may also be embedded in a computer program product, which comprises all the features enabling the implementation of the methods described herein, and which—when loaded in a computer system—is able to carry out these methods. Computer program means or computer program in the present context means any expression, in any language, code or notation, of a set of instructions intended to cause a system having an information processing capability to perform a particular function either directly or after either or both of the following: a) conversion to another language, code or, notation; and b) reproduction in a different material form.

Each WCD 102 may include, inter alia, one or more microprocessors 212 and at least one computer-readable medium that allows the microprocessor 212 to read data, instructions, messages or message packets, and other computer readable information. The computer readable medium may include non-volatile memory, such as ROM, Flash memory. Disk drive memory, CD-ROM, SIM card, and other permanent storage. Additionally, a computer medium may include, for example, volatile storage such as RAM, buffers, cache memory, and network circuits.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

While the various embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A multi-receiver wireless communication device comprising:
   a transmitter;
   a transmit oscillator communicatively coupled to the transmitter;
   a first receiver;
   a second receiver;
   a receive oscillator communicatively coupled to the first receiver; and
   a switching assembly having:
      a first state in which the receive oscillator is coupled to the first and second receivers; and
      a second state in which the receive oscillator is decoupled from the second receiver and the transmit oscillator is coupled to the second receiver.

2. The wireless communication device according to claim 1, further comprising:
   a processor operable to operate the first receiver and the second receiver of the wireless communication device independent of one another when the switching assembly is in the second state.

3. The wireless communication device according to claim 1, further comprising:
   a processor operable to:
      identify a communication mode of the wireless communication device; and
      place the switching assembly in the second state in response to identifying a communication mode that at least temporarily does not utilize the transmitter.

4. The wireless communication device according to claim 3, wherein the communication mode that at least temporarily does not utilize the transmitter is at least one of:
   an initial cell search;
   an idle mode;
   a neighbor cell monitoring gap in a traffic mode;
   a Multimedia Broadcast Multicast Service monitoring of neighbor cell mode;
   a Multimedia Broadcast Multicast Service monitoring of unicast cell mode; and
   traffic reception.

5. The wireless communication device according to claim 3, wherein the processor is further operable to:
   determine at least one of an acceptable coverage condition and a poor coverage condition; and
   place the switching assembly in the second state in response to determining an acceptable coverage condition.

6. The wireless communication device according to claim 5, wherein the processor is further operable to:
   place the switching assembly in the first state in response to determining a poor coverage condition.

7. The wireless communication device according to claim 5, wherein the processor is further operable to:
   operate the first receiver and collect first coverage statistics;
   operate the first receiver and the second receiver and collect second coverage statistics;
   determine the existence of the poor coverage condition if the second coverage statistics exceed the first coverage statistics; and
   determine the existence of the acceptable coverage condition if the second coverage statistics are less than the first coverage statistics.

8. The wireless communication device according to claim 1, further comprising:
   a processor operable to:
      sample a rate of received data;
      compare the rate of received data to a threshold value; and
      place the switching assembly in the second state in response to the rate of received data being less than the threshold value.

9. The wireless communication device according to claim 8, wherein:
   the rate of received data is an instantaneous data rate averaged over a fixed time period.

10. The wireless communication device according to claim 8, wherein the processor is further operable to:
    add at least one new interface to an SCTP bundle in response to the rate of received data being less than the threshold value.

11. The wireless communication device according to claim 1, wherein the switching assembly comprises:
    a first switch having:
       a first position coupling the receive oscillator to the second receiver; and
       a second position de-coupling the receive oscillator from the second receiver; and
    a second switch having:
       a first position coupling the transmit oscillator to the second receiver; and
       a second position de-coupling the transmit oscillator from the second receiver.

12. The wireless communication device according to claim 11, wherein the first position of the first switch and the second position of the second switch substantially coincide.

13. A method for switching receiver operations in a multi-receiver wireless communication device, the method comprising:
    determining a transmitter state of a wireless communication device having:
       a transmitter;
       a transmit oscillator communicatively coupled to the transmitter;
       a first receiver;
       a second receiver; and
       a receive oscillator communicatively coupled to the first receiver and the second receiver; and
    decoupling the receive oscillator from the second receiver and coupling the transmit oscillator to the second receiver in response to determining that the transmitter state at least temporarily does not utilize the transmitter.

14. The method according to claim 13, further comprising:
operating the first receiver and the second receiver of the wireless communication device independent of one another in response to determining that the transmitter state at least temporarily does not utilize the transmitter.

15. The method according to claim 13, wherein the communication mode that at least temporarily does not utilize the transmitter is at least one of:
an initial cell search;
an idle mode;
a neighbor cell monitoring gap in a traffic mode;
a Multimedia Broadcast Multicast Service monitoring of neighbor cell mode;
a Multimedia Broadcast Multicast Service monitoring of unicast cell mode; and
traffic reception.

16. The method according to claim 13, further comprising:
determining one of an acceptable coverage condition and a poor coverage condition; and
performing the coupling step and the decoupling step only in response to determining an acceptable coverage condition.

17. The method according to claim 16, further comprising:
collecting first coverage statistics with the first receiver;
collecting second coverage statistics with the first receiver and the second receiver; and
determining the existence of the acceptable coverage condition if the second coverage statistics are less than the first coverage statistics.

* * * * *